United States Patent [19]

Hum

[11] 4,043,826

[45] Aug. 23, 1977

[54] PROCESS FOR MAKING ARTIFICIAL ROCKS

[76] Inventor: Bing W. Hum, 5227 Palco Place, College Park, Md. 20740

[21] Appl. No.: 526,404

[22] Filed: Nov. 22, 1974

[51] Int. Cl.$^2$ ................................................ C04B 7/35
[52] U.S. Cl. ........................................ 106/90; 106/97
[58] Field of Search .................... 106/90, 97; 264/133

[56] References Cited

U.S. PATENT DOCUMENTS

| 2,307,733 | 1/1943 | DeVault | 264/133 |
| 3,850,651 | 11/1974 | Duncan et al. | 106/90 |
| 3,870,553 | 3/1975 | Hussey | 106/90 |
| 3,895,953 | 7/1975 | Mehta | 106/90 |

*Primary Examiner*—J. Poer
*Attorney, Agent, or Firm*—Craig & Antonelli

[57] ABSTRACT

A light-weight simulated rock is made by molding a composition comprising cement, a light-weight filler, water, a curing agent for the cement and an acrylic resin latex in a flexible mold and thereafter nonuniformly coloring the hardened rock body so formed with cement dyes and/or pigments.

17 Claims, No Drawings

PROCESS FOR MAKING ARTIFICIAL ROCKS

BACKGROUND OF THE INVENTION

The present invention relates to a process for making light-weight artificial decorative rock structures for use in aquariums, centerpieces and the like.

Numerous processes for making synthetic or simulated stones are known in the art. For example, note U.S. Pat. Nos. 154,163, 157,511, 185,554, 188,679, 1,604,169 and 1,890,798.

Unfortunately, the artificial stone materials made in accordance with these processes are comparatively heavy. This is disadvantageous especially when the stone products are used in decorative applications since transport of the stone material is difficult. Moreover, artificial stone materials made in accordance with these processes are normally regular in shape with smooth, flat surfaces, and therefore these artificial stone materials do not resemble natural rocks.

Accordingly, it is an object of the present invention to provide a process for making artificial decorative rock structures which are both light in weight and which resemble natural rocks both in texture and color.

It is another object of the present invention to provide a composition which can be formed into an artificial decorative rock structure simply and easily.

Still another object of the present invention is to provide a unique coloring procedure by which a solidified light-weight artificial decorative rock composition can be colored with a varying color-tone effect in order to provide a simulated rock exhibiting a pleasing and natural appearance.

SUMMARY OF THE INVENTION

These and other objects are accomplished in accordance with the present invention by molding an artificial rock molding composition composed of a cement, a light-weight filler, water, an accelerator for the cement, an acrylic latex paint, and optionally suitable pigments in a flexible removable mold. After the simulated rock molding composition is hardened, it is removed from the mold and colored by coating it with a solution or dispersion of cement dyes and/or pigments. Thereafter, a portion of the dyes and or pigments are removed preferably by rubbing to produce a nonuniform coloring effect.

The flexible mold employed to make the simulated rock is formed with a nonuniform textured molding surface so that the molded rock composition when hardened has a surface texture resembling natural rock. When the molded rock of the present invention is gently rubbed in order to remove the colorant coating, the texturized surface picks up the colorant nonuniformly and thereby produces a very pleasing, natural rock-like coloring effect. Because a light-weight filler is used, the simulated rock is significantly lighter than natural rock and is thus easy to transport.

In a preferred embodiment, the artificial rock molding composition is made from Portland cement, perlite, water, calcium chloride and a conventional acrylic resin latex paint. These materials are readily available at low cost, and consequently the simulated rock made by the inventive process is inexpensive.

DETAILED DESCRIPTION

In accordance with the inventive process, simulated rock is made by molding an artificial rock molding composition containing cement, a light-weight filler, water, an accelerator for the cement, a synthetic resin latex and optionally suitable pigments. As the cement to be utilized in this composition, Portland cement, and especially Type I and Type III Portland cements, can be used. Especially preferred are white Portland cements meeting the requirement for Type I Portland cement, ASTM designation C-150.

In addition to Portland cement, other known cements can be used. For example, aluminous cement, natural cement, oxychloride cement, magnesia cement and gypsum cements can be used. For a more thorough description of these materials see *MATERIALS HANDBOOK, Eighth Edition, GEO. S. BRADY, McGRAW-HILL BOOK CO.*, 1957, the disclosure of which is incorporated herein by reference.

As the light-weight filler material used in the inventive process, any of the known light-weight fillers can be utilized. For example, perlite, vermiculite, comminuted expanded plastics such as sytrofoam, can be utilized. Perlite, and especially horticultural grade perlite meeting NBS Voluntary Product Standard PS 23-70, can be used since this material is inexpensive and does not deteriorate over time. The filler should have a density less than the natural rock to be simulated in order that the simulated rock product of the inventive process is lighter than its natural counterpart.

As indicated above, the artificial rock molding composition also preferably contains a curing agent for the cement. Any known chemical compound which cures the particular cement utilized in the artificial rock molding composition can be utilized. When the cement is Portland cement, calcium chloride or equivalent is preferred since it is relatively available, inexpensive and exhibits a good curing action on Portland cement.

The latex paint utilized in the inventive artificial rock molding composition should be based on acrylic resins. However, minor amounts of other resins, such as for example alkyd resins, can be included. The solids content of the latexes should be roughly the same as the solid contents contained in normal commercially available acrylic latex paint, and if desired commercially available acrylic latex paints can be used as the latest component of the inventive artificial rock composition. For example, one latex which has been found to work well in the present invention is Montgomery Ward's Exterior Acrylic Latex House Paint having the following ingredients:

| 411-3132 Pigment | 40.79% (White) | |
|---|---|---|
| Zinc Oxide | | 14.82% |
| Titanium Dioxide | | 55.14% |
| Silicates | | 29.84% |
| 2-(4-thiazolyl)-Benzimidazote | | 6.20% |
| | | 100.00% |
| Vehicle | 59.21% | |
| Linseed Alkyd Resin | | 4.90% |
| Acrylic Resin | | 19.34% |
| Additives | | 1.74% |
| Water | | 74.02% |
| | | 100.00% |
| Mildewcidal ingredient | | |
| 2-(4-thiazolyl)-Benzimidazote | | 0.08% |
| Inert | | 99.92% |
| | | 100.00% |

Also, another latex which has been found to provide excellent results is Dart Drug's Latex Wall Paint having the following formulation:

| Color - Jonquil | |
|---|---|
| Titanium Dioxide Type III | 6.5% |
| Calcium Carbonate | 6.9% |
| Silica and Silicates | 26.5% |
| *Vinyl Acrylic Emulsion | 60.1% |
| | 100.0% |
| *Non-volatile: | |
| (Emulsion Solids) | 13.7% |
| Volatile: (water) | 86.3% |
| | 100.0% |

Tinting material less than 5%

In accordance with one embodiment of the present invention, a colorant such as a pigment or dye, can be included in the artificial stone molding composition prior to the molding operation. Any type of known cement colorant which can be uniformly mixed with the other ingredients in the composition can be used for this purpose. The colorant can be added to the other components in the inventive composition either by itself or preferably in admixture with the acrylic latex paint.

In forming the inventive artificial rock molding composition, the components can be mixed together in any order. However, it is preferable to first form a liquid binder composition including the curing agent and the latex paint and thereafter add the cement and the light-weight filler material thereto.

In forming the inventive artificial rock molding composition in accordance with this procedure, the curing agent is ordinarily dissolved in water and thereafter the acrylic latex is added to the curing agent solution. For example, a curing agent solution containing about 10% calcium chloride and about 90% by volume water can first be made and thereafter about 10 parts by volume of the acrylic latex can be added to about 90 parts by volume of the calcium chloride solution to form the liquid binder composition. Since the solids content of acrylic latex paints is normally about 5 to 20% and preferably 8 to 15% by volume, a binder composition formed in this manner will normally have about 0.5 to 2%, and more particularly 0.8 to 1.5% by volume latex solids.

In accordance with a particular embodiment of the invention, additional amounts of acrylic resin solids can be added to the binder composition utilized in accordance with the present invention without detracting from the advantageous properties of the simulated rock product obtained. This can be accomplished by adding a conventional aqueous acrylic latex, for example Rhoplex E-330 which is a water dispersion of an acrylic polymer manufactured by Rohm and Hass Company, to the binder composition before it is mixed with the other ingredients. In this embodiment, the binder composition can include as much as 20% acrylic resin solids.

Once the liquid binder composition is made, the cement and light-weight aggregate filler can be added thereto. The relative amounts of the cement, light-weight filler and binder solution used in the inventive artificial rock molding composition are preferably equal on a volume basis. However, the amount of cement can be increased or decreased by about 10 volume % and the amount of aggregate filler can be increased or decreased by about 10 volume % without adversely effecting the properties of the composition. As can be appreciated by those skilled in the art, the amount of the liquid binder composition in the inventive artificial rock molding composition determines the setting time and should normally be maintained to between about −15% to +20% by volume of the amount indicated (namely, an equal volume portion with respect to both the cement and the filler) in order to prevent adverse effects on the properties of the composition. In this connection, it has been found that if more than a 20 volume % excess of the liquid binder composition is used, the set time for the molding composition increases from the normal 6 to 8 hours to the much longer period of 10 to 14 hours. Also, if the amount of liquid binder composition used is less than 85% of an equal volume portion, detail in the surface configuration of the molded simulated rock product is lost due to the high viscosity of the molding composition. In any event, when formulating the inventive artificial rock molding composition in accordance with this technique, the general proportions as set forth above should be utilized. Also, if another technique is utilized for formulation of the molding composition, the proportions of ingredients should correspond to those described above. Of course, the amount of curing agent added to the inventive solution can be increased or decreased to take into account the curing action of the particular curing agent used on the particular cement used, but in any event the amount of curing agent should correspond with the amount utilized in the foregoing description.

The artificial rock molding composition is then poured into a mold, preferably flexible, which has a non-uniform textured molding surface simulating natural rock. Normally, the viscosity of the artificial rock molding composition will be sufficiently low so that the composition readily fills the grainy indentations and crevices in the mold surface. When, however, the molding composition is relatively viscous, it may be necessary to work or press the molding composition into the mold in order to remove trapped air and ensure that the molding composition completely fills the crevices and indentations in the mold surface.

Once the inventive artificial rock molding composition is poured into a flexible mold, it is allowed to harden to a coherent body. The hardened coherent body is then removed from the flexible mold so that another rock can be molded. Normally, the hardened coherent body can be removed from the mold after about 6 to 8 hours of curing, although this curing time can be shortened by the application of heat. As indicated above, the flexible mold utilized in the inventive process preferably has a non-uniform textured molding surface. Accordingly, the hardened coherent body produced by the molding operation has a textured, grainy surface resembling the surface of natural rock.

After the hardened body removed from the mold has cured and dried sufficiently so that its surface shows no dampness, the hardened body is colored. This is accomplished in accordance with the present invention by coating the colored body with an aqueous solution or dispersion of a colorant material, preferably by submerging the body in a bath of the colorant solution or dispersion. The colorant material utilized may be any known colorant for cement such as dyes, pigments and the like. For example, ultramarine blue, carbon black, lamp black and red, yellow and brown oxides can be used. If a nonstable dispersion of colorant is used for this procedure, the dispersion is preferably mixed either immediately before or during the coloring process in order that sufficient colorant is imparted to the surface of the coherent rock body.

After the hardened rock body is coated with the aqueous colorant composition, it is allowed to dry. Since the hardened rock body includes a significant amount of cement, initial drying of the colorant coating is rapid since the cement takes up the water in the coating.

After the colorant coating has dried for a suitable period of time, a portion of the colorant coating layer is removed. This is preferably accomplishd by gently rubbing the surface of the rock body with a rag or cloth dampened with water. Such a procedure will remove more or less of the colorant coating layer depending on its dryness. Because the surface of the rock body is textured, the colorant coating layer will be removed nonuniformly with more colorant remaining in the cracks, indentations and concavities in the rock surface. As a result, it is possible to provide a very pleasing surface appearance simulating that of many different kinds of natural rocks. Moreover, by including a colorant material in the artificial rock molding composition, very pleasing two-tone coloring effects can be produced.

As indicated above, the colored hardened rock body is subjected to a colorant removal procedure after the colorant layer has partially dried. Normally, the colorant removal procedure should be accomplished before the colorant layer is completely dry in order that enough colorant can be removed. If the colorant layer is allowed to completely dry, substantially no colorant can be removed. Also, the colorant removal step should not be accomplished too soon after the hardened rock body is removed from the colorant bath since too much colorant will be removed. The best time to accomplish the colorant removal step can be easily determined by those skilled in the art through simple experimentation and is normally between about 5 minutes to 2 hours after removal of the hardened rock body from the colorant bath.

The simulated rocks produced by the inventive process described above can be advantageously used in many applications. Because of their light weight and visually-pleasing appearance, they can be used as decorations in aquariums, artificial rock centerpieces and the like. Also, because the inventive artificial rock compositon can be formed into substantially any shape, the inventive process can be used to provide rock-like articles having many diverse utilities. For example, flower pots, plant enclosures, patio furniture, and the like can be made in accordance with the inventive process. Also, prefabricated anchoring pieces for supporting flowers in a floral arrangement can be made by the inventive process. In all of these applications, the simulated rock and stone-like products produced are comparatively light in weight due to the use of the light-weight filler. Moreover, because of the molding and coloring procedures employed, these products also exhibit a very pleasing rock-like appearance making them interesting objects d'art.

In accordance with another embodiment of the present invention, the simulated rock product obtained as described above is coated with an aqueous acrylic latex which upon drying forms a transparent or semi-transparent coating, such as for example the Rhoplex E-330 described above. The simulated rock product obtained by the present invention may undergo slight surface degradation if subjected to significant abrasion. This surface degradation can be reduced or eliminated without detracting from the pleasing visual properties of the simulated rock product by forming a protective coating of acrylic resin solids.

Although the present invention has been fully described above, the following examples are provided in order to further illustrate its features:

EXAMPLE 1

90 parts by volume of an aqueous solution containing 9 to 10 volume % calcium chloride and having a specific gravity of slightly over 9 pounds per gallon is admixed with 10 parts by volume of a commercially available latex paint to produce an aqueous binder composition. The latex paint utilized is Dart Drug Latex Wall Paint having the following composition:

| Color - Jonquil | |
|---|---|
| Titanium Dioxide Type III | 6.5% |
| Calcium Carbonate | 6.9% |
| Silica and Silicates | 26.5% |
| *Vinyl Acrylic Emulsion | 60.1% |
| | 100.0% |
| *Non-volatile: | |
| (Emulsion Solids) | 13.7% |
| Volatile: (water) | 86.3% |
| | 100.0% |

Tinting material less than 5%

To this aqueous binder composition is added Atlas White Portland Cement which is a Type I Portland cement conforming to the standard specification for Portland cement, ASTM designation: C-150. In addition, horticultural perlite Pa-Lite-20 manufactured by Pennsylvania Perlite Company, which is a horticultural perlite complying with NBS voluntary standard, PS-23-70 is also added. The mixing ratio of the cement, horticultural perlite and aqueous binder composition is 1:1:1, respectively, on a volume basis. The ingredients are thoroughly mixed to form homogeneous artificial rock molding composition.

The molding composition so obtained is poured into a flexible mold formed in the shape of a natural rock. The molding surface of the mold is texturized to simulate the texturized surface of natural rock.

The molding composition is allowed to dry and set in the mold at a temperature of about 70° to 77° F. After about 7 hours, the composition hardens sufficiently so that it can be removed from the mold without breaking. After removal from the mold, the hardened rock body so obtained is allowed to dry three more hours before the beginning of the coloring procedure.

In carrying out the coloring procedure, the hardened rock body is submerged in a dispersion of aproximately two teaspoonfuls of lamp black per 250 cc of water. The colored body is then removed from the dispersion and allowed to dry in air for approximately 5 to 10 minutes. At this time, the colored body is completely covered with a partially dry adherent layer of lamp black.

Next, the body is submerged in water, and then rubbed with a cloth to remove a portion of the lamp black coating. Rubbing is continued until most of the surface lamp black has been removed. Much of the lamp black which has seeped into the grain of the texturized surface, however, remains so that a pleasing two-tone coloring effect is produced. The colored rock body is then allowed to dry to produce a light weight, visually-pleasing simulated rock.

EXAMPLE 2

Example 1 is repeated except that the mixing ratio of the cement, horticultural perlite and aqueous binder composition is changed to 1:1:0.6, respectively, on a volume basis. With this mixing ratio, the artificial rock molding composition is quite viscous, and accordingly, the composition is pressed against the sides of the mold in order to remove trapped air. After 5 hours, the hardened rock body is removed from the flexible mold.

As in Example 1, a light weight, simulated rock is produced. However, the simulated rock of this example lacks some of the surface detail of the rock obtained in Example 1.

EXAMPLE 3

Example 1 is repeated except that the mixing ratio of the cement, horticultural perlite and aqueous binder composition is changed to 1:1:1.5, respectively, on a volume basis. With this mixing ratio, the artificial rock molding composition is allowed to harden for about 12 hours before being removed from the flexible mold. As in Example 1, a light-weight, visually-pleasing simulated rock is produced.

EXAMPLE 4

Example 1 is repeated except that hardening of the artificial rock molding composition is conducted at a temperature of about 105° F. Under these conditions, the molding composition is hardened sufficiently to be removed from the mold after curing for about 5 hours. A simulated rock having substantially the same properties and appearance as the simulated rock of Example 1 is produced.

EXAMPLE 5

Example 2 is repeated except that the artificial rock molding composition is cured at a temperature of about 105° F. Under these conditions, the molding composition is hardened sufficiently to be removed from the mold after curing for about 3 hours. A simulated rock having substantially the same properties and appearance as the simulated rock of Example 2 is produced.

EXAMPLE 6

Example 3 is repeated except that the artificial rock molding composition is allowed to cure at a temperature of about 105° F. Under these conditions, the molding composition is hardened sufficiently to be removed from the mold after curing for about 10 hours. A simulated rock having substantially the same properties and appearance as the simulated rock of Example 3 is produced.

Although only a few specific embodiments of the present invention have been described above, it should be appreciated that many modification can be made without departing from the spirit and scope of the invention. For example, a rigid mold rather than a flexible mold can be used in the molding operation, although a flexible mold is preferred since mold seam lines are not introduced into the simulated rock product. Also, the concentration of the colorant in the coloring bath used in the coloring procedure of the present invention can be varied from that disclosed above provided that enough colorant is utilized to substantially coat the hardened rock body during the coloring procedure. Also, techniques for removing excess colorant other than the rubbing technique described above can be utilized provided that they will selectively remove at least a portion of the colorant on the more prominant parts of the texturized rock surface, leaving greater amounts of colorant in the grains and crevices of the textured rock surface.

The foregoing description has been presented for illustrative purposes only and is not intended to limit the invention in any way. All reasonable modifications not specifically set forth are intended to be included within the scope of the present invention, which is to be limited only by the following claims.

What is claimed is:

1. A process for making light-weight simulated rock structures comprising molding an artificial rock molding composition comprising cement, a light-weight filler, water, a curing agent for the cement, and an acrylic resin latex paint in a mold having a nonuniform, grainy-textured molding surface to form a hardened rock body exhibiting a grainy surface resembling the surface of natural rock, said grainy surface defining cracks, indentations and concavities therein, removing the hardened rock body from the mold, applying to at least a portion of the grainy surface of the hardened rock body a coating of a cement colorant, and thereafter removing a portion of the coating of said cement colorant nonuniformly such that cement colorant preferentially resides in said cracks, identations and concavities, whereby a light-weight nonuniformly colored simulated rock structure is produced.

2. The process of claim 1, wherein said artificial rock molding composition comprises:
   A. 1 part by volume ± 10 volume % of a cement,
   B. 1 part by volume ± 10 volume % of a light-weight filler, and
   C. at least 0.85 parts by volume of an aqueous binder composition comprising:
      1. water,
      2. a curing agent for said cement in an amount effective to cure the cement in said artificial rock molding composition, and
      3. an aqueous acrylic latex paint in an amount sufficient to provide about 0.5 to 2 volume % latex solids in said aqueous binder composition.

3. The process of claim 2, wherein said cement is Portland cement and further wherein said light-weight filler is horticultural perlite.

4. The process of claim 1, wherein said hardened rock body is colored by coating the surfaces of said hardened rock body with an aqueous dispersion or solution of said cement colorant to form a colorant coating layer on said hardened rock body and thereafter nonuniformly removing a portion of said coating layer to provide a simulated rock structure having a nonuniformly colored surface.

5. The product of the process of claim 1.

6. The product of the process of claim 2.

7. The process of claim 9 wherein said aqueous binder composition further contains (4) an aqueous acrylic latex, the total amount of acrylic solids from said acrylic latex paint (3) and said aqueous acrylic latex (4) being no more than about 20% by volume.

8. The process of claim 2, wherein the maximum amount of said aqueous binder composition is about 1.2 parts by volume.

9. The process of claim 1 further comprising coating said simulated rock structure with an aqueous dispersion of an acrylic latex.

10. The process of claim 4, wherein nonuniform removal of a portion of the coating layer is accomplished by rubbing whereby portions of said coating layer in said cracks, indentations and concavities remain while other portions of the coating layer are removed.

11. The process of claim 10, wherein said coating is rubbed five minutes to two hours after the surfaces of said hardened rock body have been coated with said aqueous dispersion or solution.

12. The process of claim 2, wherein the amount of aqueous binder composition in said artificial rock molding composition is 0.85 to 1.2 parts by volume.

13. The process of claim 12, wherein said hardened rock body is colored by coating the surfaces of said hardened rock body with an aqueous dispersion or solution of said cement colorant to form a colorant coating layer on said hardened rock body and thereafter nonuniformly removing a portion of said coating layer to provide a simulated rock structure having a nonuniformly colored surface.

14. The process of claim 13, wherein nonuniform removal of a portion of the coating layer is accomplished by rubbing whereby portions of said coating layer in said cracks, indentations and concavities remain while other portions of the coating layer are removed.

15. The process of claim 14, wherein said coating is rubbed five minutes to two hours after the surfaces of said hardened rock body have been coated with said aqueous dispersion or solution.

16. The process of claim 1, wherein said mold is flexible.

17. A process for making light-weight simulated rock structures comprising molding an artificial rock molding composition comprising cement, a light-weight filler, water, a curing agent for the cement, and an acrylic resin latex paint in a mold having a nonuniform, grainy-textured molding surface to form a hardened rock body exhibiting a grainy surface resembling the surface of natural rock, said grainy surface defining cracks, indentations and concavities therein, removing the hardened rock body from the mold, and applying to at least a portion of the surface of the hardened rock a cement colorant, said cement colorant being applied nonuniformly such that cement colorant preferentially resides in said cracks, indentations and concavities, whereby a light-weight nonuniformly colored simulated rock structure is produced.

* * * * *